(12) United States Patent
Park

(10) Patent No.: US 11,089,218 B2
(45) Date of Patent: Aug. 10, 2021

(54) LOW POWER CHANGE DETECTION AND REDUCTION OF SENSOR POWER

(71) Applicant: QUALCOMM Incorporated, San Diego, CA (US)

(72) Inventor: Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 16/592,678

(22) Filed: Oct. 3, 2019

(65) Prior Publication Data

US 2021/0105414 A1   Apr. 8, 2021

(51) Int. Cl.
*H04N 5/232* (2006.01)

(52) U.S. Cl.
CPC ... *H04N 5/232411* (2018.08); *H04N 5/23218* (2018.08)

(58) Field of Classification Search
CPC .................. H04N 5/232411; H04N 5/23218
See application file for complete search history.

(56) References Cited

U.S. PATENT DOCUMENTS

2019/0248302 A1* 8/2019 Lee ..................... H04N 5/2257

* cited by examiner

*Primary Examiner* — Twyler L Haskins
*Assistant Examiner* — Fayez A Bhuiyan
(74) *Attorney, Agent, or Firm* — Qualcomm Incorporated

(57) ABSTRACT

Methods, systems, and devices for change detection are described. The methods, systems, and devices relate to monitoring a field of view of an image sensor via a first pixel associated with a group of pixels of the image sensor, where a dimension of the first pixel exceeds a dimension of at least one pixel of the group of pixels of the image sensor, detecting a change in the field of view of the image sensor based on the monitoring, and activating a second pixel of the image sensor based on detecting the change in the field of view of the image sensor.

18 Claims, 10 Drawing Sheets

LOW POWER CHANGE DETECTION AND REDUCTION OF SENSOR POWER

BACKGROUND

The following relates generally to image processing, and more specifically to low power change detection and reduction of sensor power.

Change detection includes detecting regions of change in one or more images of a scene taken at different times and is of interest in a large number of applications including remote sensing, surveillance, home automation and security, medical diagnosis and treatment, natural disaster detection and impact, civil infrastructure, underwater sensing, deforestation, urban growth, etc. Change detection may include processing steps and decision rules in change detection techniques such as significance and hypothesis testing, predictive models, shading models, and background modeling. In some examples, change detection includes certain deficiencies in power consumption and processing times.

SUMMARY

The described techniques relate to improved methods, systems, devices, and apparatuses that support low power change detection and reduction of sensor power. Generally, the described techniques provide for reducing the amount of power an image sensor uses and decreasing the processing time the image sensor takes to detect events or changes in a field of view of the image sensor. The present techniques relate to using one or more sensing pixels to detect changes in a scene. In some cases, the one or more sensing pixels may be larger than at least one pixel of an image sensor (e.g., longer dimension, larger area, larger aspect ratio). In some cases, at least one sensing pixel may be placed on an outside edge of an image sensor to monitor for change detection. In some cases, at least one pixel of an image sensor may be activated when a sensing pixel detects a change.

A method of image change detection is described. The method may include monitoring a field of view of an image sensor via a first pixel associated with a group of pixels of the image sensor, where a dimension of the first pixel exceeds a dimension of at least one pixel of the group of pixels of the image sensor, detecting a change in the field of view of the image sensor based on the monitoring of the first pixel, and activating a second pixel of the image sensor based on detecting the change in the field of view of the image sensor.

An apparatus for image change detection is described. The apparatus may include a processor, memory coupled with the processor, and instructions stored in the memory. The instructions may be executable by the processor to cause the apparatus to monitor a field of view of an image sensor via a first pixel associated with a group of pixels of the image sensor, where a dimension of the first pixel exceeds a dimension of at least one pixel of the group of pixels of the image sensor, detect a change in the field of view of the image sensor based on the monitoring of the first pixel, and activate a second pixel of the image sensor based on detecting the change in the field of view of the image sensor.

Another apparatus for image change detection is described. The apparatus may include means for monitoring a field of view of an image sensor via a first pixel associated with a group of pixels of the image sensor, where a dimension of the first pixel exceeds a dimension of at least one pixel of the group of pixels of the image sensor, detecting a change in the field of view of the image sensor based on the monitoring of the first pixel, and activating a second pixel of the image sensor based on detecting the change in the field of view of the image sensor.

A non-transitory computer-readable medium storing code for image change detection is described. The code may include instructions executable by a processor to monitor a field of view of an image sensor via a first pixel associated with a group of pixels of the image sensor, where a dimension of the first pixel exceeds a dimension of at least one pixel of the group of pixels of the image sensor, detect a change in the field of view of the image sensor based on the monitoring of the first pixel, and activate a second pixel of the image sensor based on detecting the change in the field of view of the image sensor.

In some examples of the method, apparatuses, and non-transitory computer-readable medium described herein, detecting the change in the field of view may include operations, features, means, or instructions for detecting a potential change based on the monitoring of the first pixel, and determining that the potential change exceeds a change threshold based on detecting the potential change.

Some examples of the method, apparatuses, and non-transitory computer-readable medium described herein may further include operations, features, means, or instructions for monitoring the field of view of the image sensor via the second pixel, where a dimension of the second pixel may be less than a dimension of the first pixel, where detecting the change in the field of view of the image sensor may be based on monitoring the field of view of the image sensor via the second pixel.

Some examples of the method, apparatuses, and non-transitory computer-readable medium described herein may further include operations, features, means, or instructions for activating the at least one pixel from the group of pixels or at least one pixel of the image sensor based on detecting the change in the field of view of the image sensor by the monitoring of the first pixel, or based on detecting a change in the field of view of the image sensor by the monitoring of the second pixel, or based on detecting the change in the field of view of the image sensor by the monitoring of the first pixel and by the monitoring of the second pixel.

In some examples of the method, apparatuses, and non-transitory computer-readable medium described herein, the dimension of the first pixel or the dimension of the second pixel exceed the dimension of the at least one pixel from the group of pixels.

Some examples of the method, apparatuses, and non-transitory computer-readable medium described herein may further include operations, features, means, or instructions for capturing, via the image sensor, an image based on detecting the change in the field of view of the image sensor.

In some examples of the method, apparatuses, and non-transitory computer-readable medium described herein, a sensitivity of the second pixel may be less than or greater than a sensitivity of the first pixel.

In some examples of the method, apparatuses, and non-transitory computer-readable medium described herein, an aspect ratio of the second pixel may be different than an aspect ratio of the first pixel.

Some examples of the method, apparatuses, and non-transitory computer-readable medium described herein may further include operations, features, means, or instructions for detecting the change in the field of view of the image sensor may be based on a change in brightness detected by the first pixel, a change in contrast detected by the first pixel, a change in color detected by the first pixel, a movement in the field of view detected by the first pixel, or any combination thereof.

In some examples of the method, apparatuses, and non-transitory computer-readable medium described herein, the first pixel may be located at an outer edge of the image sensor or an outer edge of the group of pixels of the image sensor.

In some examples of the method, apparatuses, and non-transitory computer-readable medium described herein, the second pixel may be located at an outer edge of the image sensor or an outer edge of the group of pixels of the image sensor, and the first pixel may be located at an outer edge of the second pixel.

In some examples of the method, apparatuses, and non-transitory computer-readable medium described herein, the first pixel spans an edge of the image sensor or an edge of the group of pixels of the image sensor.

In some examples of the method, apparatuses, and non-transitory computer-readable medium described herein, the second pixel may be adjacent to the first pixel.

In some examples of the method, apparatuses, and non-transitory computer-readable medium described herein, at least the first pixel and the second pixel may be co-located on an outer edge of the image sensor or an outer edge of the group of pixels of the image sensor.

DETAILED DESCRIPTION

Figure 1:
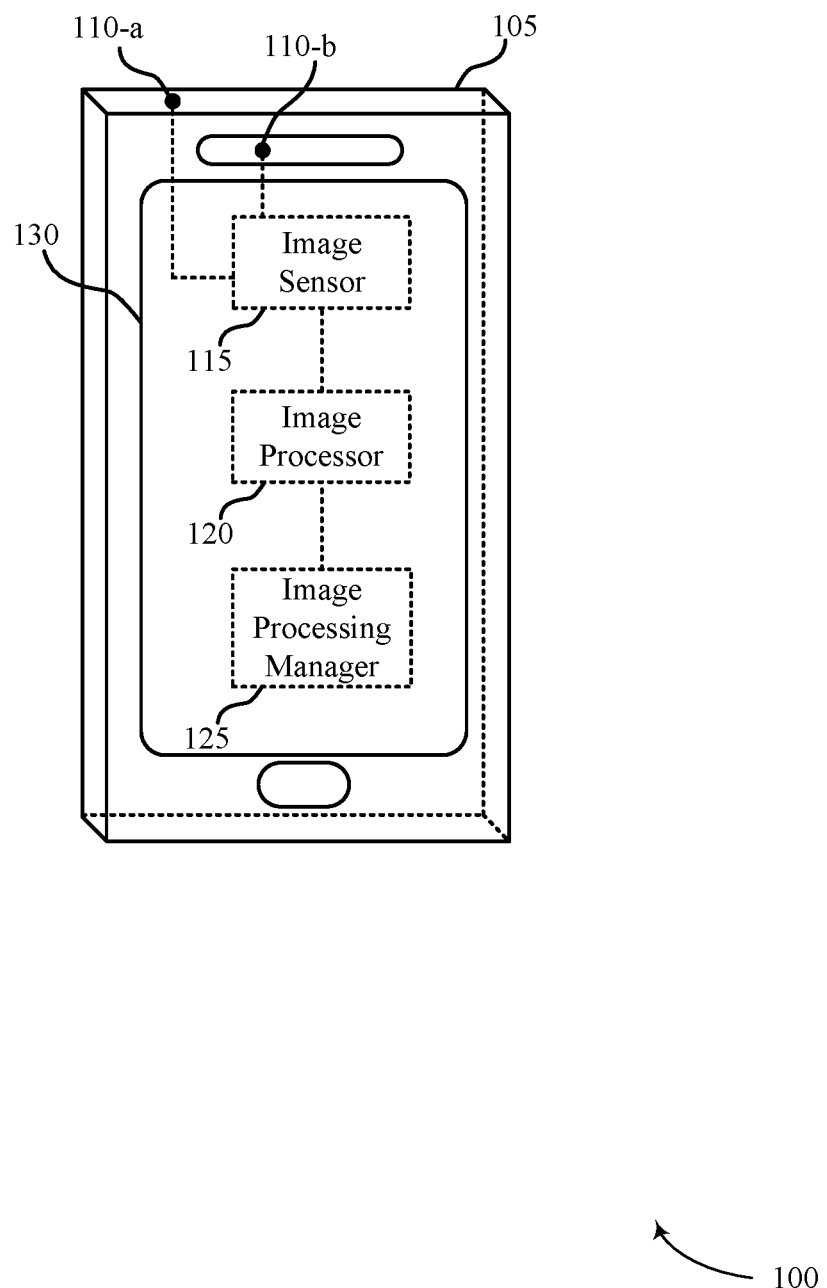
FIG. 1 illustrates an example of a system for low power change detection that supports pixel for low power change detection and reduction of sensor power in accordance with aspects of the present disclosure.

Image sensor pixels may be assembled in one or more patterns. In some examples, an individual image sensor pixel may be rectangular and a group of image senor pixels may be arranged in a rectangular pattern. In some examples, an image sensor may be configured to detect changes in a scene monitored by the image sensor. However, other different change detection techniques are deficient in several ways. For example, other different change detection may include continually powering all the pixels of an image sensor, which results in excessive power consumption by the image sensor. Also, pixels of another different image sensor are relatively small, and small pixels have comparatively longer detection times, which results in excessive change detection duty cycles and processing times.

The present techniques reduce power consumption and processing times compared to other different techniques. For example, the present techniques reduce power consumption by dynamically deactivating one or more pixels (e.g., not applying or reducing power to one or more pixels) of an image sensor when no change is detected and activating pixels (e.g., applying power or increasing power to pixels) of the image sensor when a change is detected.

Changes in a monitored scene may come from a change detected at an outer edge of the image sensor. The present techniques may include using a relatively large sensing pixel and using the large sensing pixel relatively near or adjacent to an image sensor. For example, one or more large sensing pixels may be placed adjacent to one or more outer edges of an image sensor (e.g., along a top edge, bottom edge, or side edge of an image sensor). In some examples, at least one sensing pixel may be placed at an outer edge of an image sensor, or in contact with a row of an image sensor (e.g., a row on an outer edge, an inner row), or in contact with a column of an image sensor (e.g., a column on an outer edge, an inner column), or placed between or in contact with two rows, or placed between or in contact with two columns, or any combination thereof.

The present techniques may include powering the one or more large sensing pixels to monitor for change detection relative to one or more edges of the image sensor while at least a portion of the pixels of the image sensor are deactivated (e.g., those located farther from an edge), and activating pixels of the image sensor when the large sensing pixel detects a change. In some examples, the present techniques may include placing a large sensing pixel within an image sensor (e.g., between two rows of pixels of the image sensor, between two columns of pixels of the image sensor).

Power consumption of an image sensor is related to the number of active pixels being read. Power consumption is also related to the exposure time of the image sensor. Increasing the size of a pixel reduces the time it takes for the pixel to detect photons. Accordingly, increasing the size of a pixel (e.g., using a large sensing pixel) reduces power consumption and decreases processing times for change detection.

In some examples, multiple large sensing pixels may be placed relative to an image sensor. In some examples, a first large sensing pixel may be activated to monitor for change detection while a second large sensing pixel and pixels of the image sensor may be deactivated. When the first large sensing pixel detects change, the second large sensing pixel or pixels of the image sensor, or both, may be activated. In some examples, when the first large sensing pixel detects change, the second large sensing pixel may be activated while pixels of the image sensor remain deactivated. In some examples, when the first large sensing pixel and the second large sensing pixel both detect a change, pixels of the image sensor may be activated. In some examples, an aspect ratio or area of the first large sensing pixel may be the same as or different from an aspect ratio or area of the second large sensing pixel.

Aspects of the disclosure are initially described in the context of a wireless communications system. Aspects of the disclosure are further illustrated by and described with reference to enhanced change detection image sensors. Aspects of the disclosure are further illustrated by and described with reference to apparatus diagrams, system diagrams, and flowcharts that relate to pixel for low power change detection and reduction of sensor power.

FIG. 1 illustrates an example of a system 100 for low power change detection. In the illustrated example, system 100 includes a device 105. Examples of device 105 may include a smart phone device, a personal digital assistant, a tablet computer, a laptop computer, a desktop computer, a handheld audio recording device, or any combination thereof. As shown, device 105 may include at least one camera 110 (e.g., back-facing camera 110-a, front-facing camera 110-b), an image sensor 115 connected to the cameras 110, an image processor 120, and an image processing manager 125 connected to image processor 120. In some examples, device 105 may include a screen 130 (e.g., to display images captured by cameras 110). Although a single image sensor is shown (image sensor 115), in some examples, back-facing camera 110-a may be connected to a first image sensor and front-facing camera 110-b may be connected to a second image sensor, and both the first image sensor and the second image sensor may be connected to image processor 120. In some examples, cameras 110 may be configured for low-power change detection. For example, cameras 110 may be configured to detect a change in a field of view based on a reduction of power used by image sensor 115 compared to other different change detection devices.

In some examples, image processing manager 125, in conjunction with image sensor 115 and/or image processor 120, may perform one or more operations described herein. For example, image processing manager 125 may monitor a field of view of an image sensor via a first pixel associated with a group of pixels of image sensor 115. In some examples, a dimension of the first pixel may be different from a dimension of at least one pixel of the group of pixels of the image sensor. For example, a dimension of the first pixel may be greater than or less than a dimension of at least one pixel of the group of pixels of the image sensor. In some examples, image processing manager 125 may detect a change in the field of view of image sensor 115 based at least in part on the monitoring of the first pixel. In some examples, image processing manager 125 may activate a second pixel of image sensor 115 based at least in part on image processing manager 125 detecting the change in the field of view of the image sensor 115.

In some examples, image processing manager 125 monitoring the field of view and detecting a change in the field of view may be based on image processing manager 125 running one or more change detection algorithms. In some examples, image processing manager 125 may detect the change in the field of view may include image processing manager 125 detecting a potential change based at least in part on the image processing manager 125 monitoring the first pixel and image processing manager 125 determining that the potential change exceeds a change threshold based at least in part on detecting the potential change.

In some examples, image sensor 115 may be stationary for at least a given period of time and the detected change in the field of view may be a change or movement (e.g., an object moving) in the scene captured by the stationary, for at least the time being, image sensor 115. In other cases, image sensor 115 may be moving or panning and the detected change in the field of view may be a change or movement in the scene captured by image sensor 115 at least as a result of image sensor 115 moving or panning.

In some examples, a change aspect may be analyzed based on the change threshold to determine whether a detectable change has occurred. Examples of the change aspect may include a change in brightness, or change in contrast, or change in color, or a change in illumination, or a change in reflectance, or a movement of an object already in the field of view, or a previously unseen object moving into the field of view, or any combination thereof. In one example, a previous or first level of the change aspect (e.g., a first brightness level measured by at least one pixel of image sensor 115) may be compared to a subsequent or second level of the change aspect (e.g., a second brightness level measured by the at least one pixel of image sensor 115). When the difference between the first level of the change aspect and the second level of the change aspect exceeds the change threshold, then image processing manager 125 may determine that a detectable change has occurred.

In some examples, image processing manager 125 may monitor the field of view of image sensor 115 via the second pixel. In some examples, a dimension of the second pixel may be less than (or greater than) a dimension of the first pixel. In some examples, detecting the change in the field of view of image sensor 115 is based at least in part on monitoring the field of view of the image sensor via the second pixel. For example, in some examples, detecting the change may be based on detecting the change by the first pixel, or the second pixel, or both.

The operations of image processing manager 125, in conjunction with image sensor 115 and/or image processor 120, result in faster change detection. For example, the first pixel and/or second pixel may be larger in area than other pixels of image sensor 115. The larger area of the first pixel and/or second pixel may enable the first pixel and/or second pixel to detect photons quicker than smaller pixels (i.e., a larger pixel collects more photons so a larger pixel can detect the same number of photons as a smaller pixel, but in a shorter period of time). Accordingly, the larger area of the first pixel and/or second pixel may enable device 105 to perform change detection faster (e.g., shorter exposure time) than devices with other different image sensors. In some examples, the first pixel and/or second pixel may be placed on an outer edge of image sensor 115, and thus, image processing manager 125, via the first pixel and/or second pixel, may detect events (e.g., change detection) on the edge of image sensor 115, where a relatively large number of detectable events occur.

The operations of image processing manager 125, in conjunction with image sensor 115 and/or image processor 120, result power savings over other different change detection devices. In some examples, at least a portion of pixels (e.g., group of pixels, matrix of pixels, grid of pixels) of image sensor 115 may be placed in a deactivated state. In some examples, the at least portion of pixels may be deactivated after image processing manager 125 does not detect any changes or events for a certain period of time. In some examples, the at least portion of pixels may be deactivated when image processing manager 125 detects a change or event. The deactivation of the at least portion of pixels of image sensor 115 results in power savings over other different change detection devices.

Figure 2:
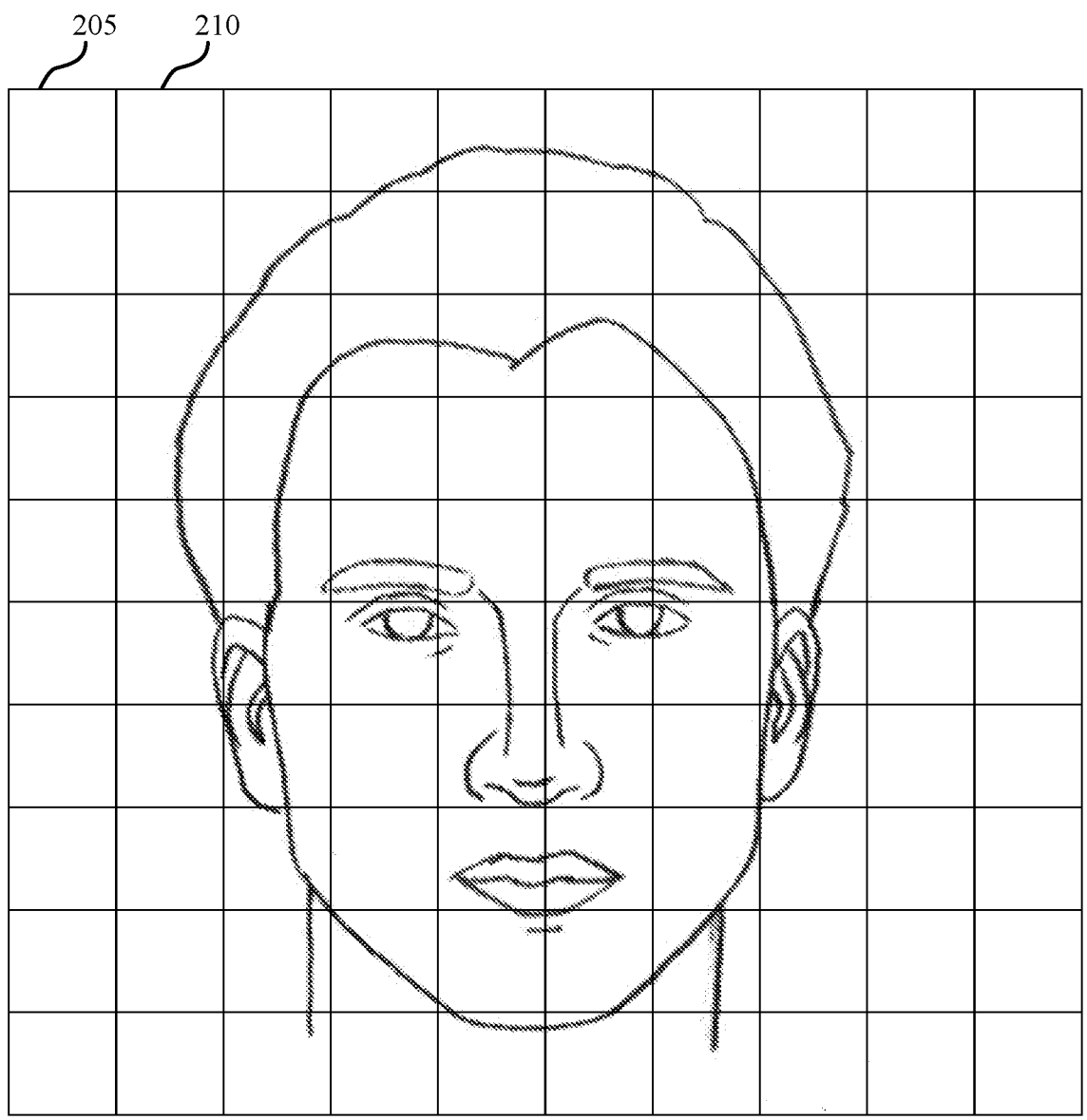
FIG. 2 illustrates an example of an image sensor that supports low power change detection and reduction of sensor power in accordance with aspects of the present disclosure.

FIG. 2 illustrates an example of an image sensor 200 that supports pixel for low power change detection and reduction of sensor power in accordance with aspects of the present disclosure. In some examples, image sensor 200 may implement aspects of system 100.

Image sensor 200 may sense light in a given field of view or scene to generate an image. Image sensor 200 may be an example of image sensor 115 of FIG. 1. In some examples, image sensor 200 may be part of an image capturing device (e.g., digital camera, mobile phone camera, video camera, security camera, etc.). Image sensor 200 may be interoperable with an image processor (e.g., image processor 120) capable of implementing aspects of the present disclosure. Image sensor 200 may include multiple pixels (e.g., an array of pixels that includes pixel 205, pixel 210, etc.).

Aspects of the present disclosure relate to improved techniques for change detection (e.g., movement of a detected object) that are quicker and less power intensive than other different techniques. A device (e.g., an image capturing device) may include an array of pixels representing an image sensor 200. The device may identify one or more aspects of a field of view. For example, the device may detect an object in the field of view, or a movement of an object in the field of view, or an object coming into the field of view, or a change in a brightness level associated with the field of view, or a change in a contrast level associated with the field of view, or another condition, or any combination thereof.

In some examples, image sensor 200 may perform operations on at least one of the multiple pixels (e.g., at least pixel 205 and/or pixel 210) to detect image aspects. Examples of image aspects may include brightness, color, contrast, objects, object features. In some examples, image sensor 200 may analyze at least one detected image aspect to detect a change in a field of view of image sensor 200.

In some examples, a visual change in a field of view or scene detected by image sensor 200 may occur in relation to an outer edge of image sensor 200 compared to the center of image sensor 200 (e.g., an object entering an edge of an image). For example, a change in a field of view detected by image sensor 200 may occur as a result of an object coming into the field of view from an outer edge compared to detecting the movement of an object or feature already in the field of view (e.g., an object coming into the field of view as image sensor 200 is panned or an object moving into the field of view of a stationary image sensor 200). Accordingly, the present techniques may improve change detection by improving the detection of changes at the edge of image sensor 200.

Additionally or alternatively, in some examples, a visual change in a field of view or scene detected by image sensor 200 may occur in relation to a center portion of image sensor 200 (e.g., an object entering a center portion of an image, such as an object entering from a door or entrance that is in or near a center of a field of view). Accordingly, the present techniques may improve change detection by improving the detection of changes at a center location with having one or more larger pixels corresponding to a center area (e.g., non-edge area) edge of image sensor 200.

Figure 3:
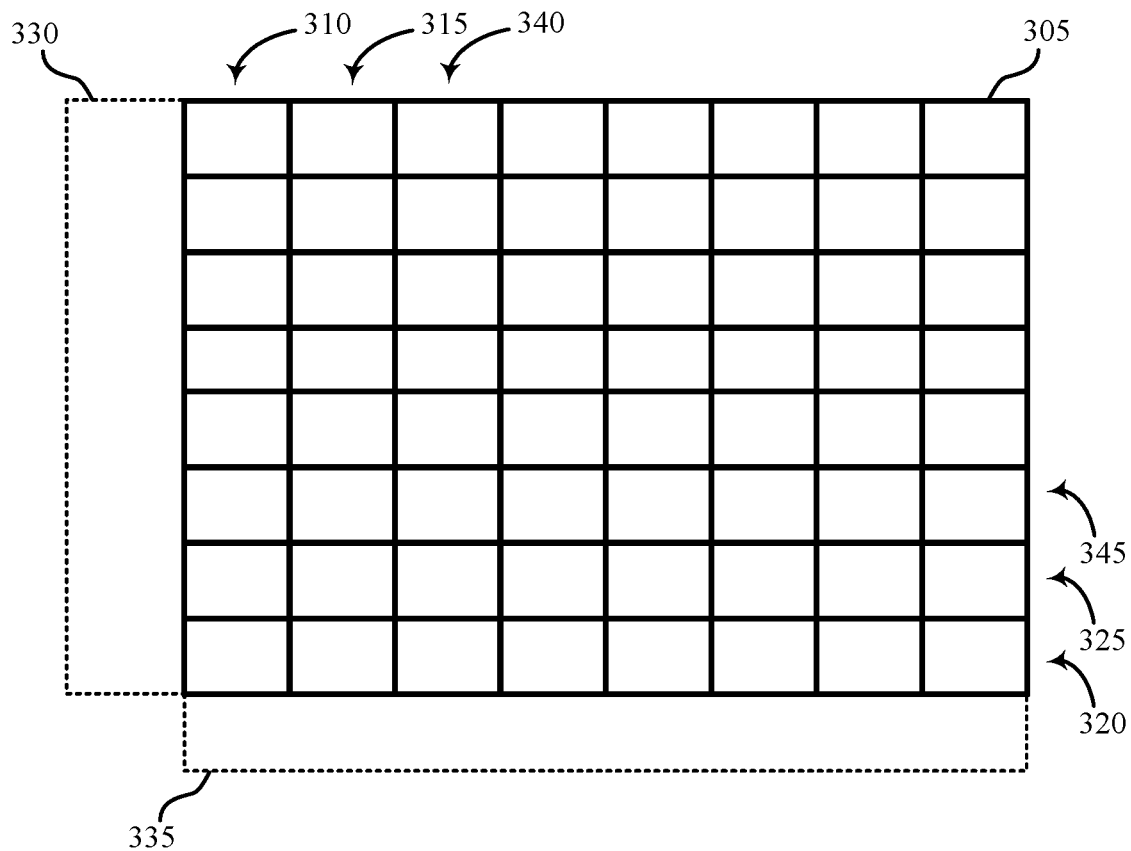
FIG. 3 illustrates an example of an image sensor that supports low power change detection and reduction of sensor power in accordance with aspects of the present disclosure.

FIG. 3 illustrates an example of an image sensor 300 that supports pixel for low power change detection and reduction of sensor power in accordance with aspects of the present disclosure. In some examples, image sensor 300 may implement aspects of system 100.

Image sensor 300 may be an example of image sensor 115 of FIG. 1 or image sensor 200 of FIG. 2. In some examples, image sensor 300 may include an array of pixels (e.g., array 305). As shown, array 305 may include one or more columns of pixels (e.g., first column 310 and second column 315) and one or more rows of pixels (e.g., first row 320 and second row 325). In some examples, image sensor 300 may include first pixel 330 or second pixel 335, or first pixel 330 and second pixel 335. As shown, first pixel 330 or second pixel 335 may be positioned on or near an outer edge of array 305. In some examples, one or more operations described herein may be performed by or in conjunction with first pixel 330, or second pixel 335, or both.

Although first pixel 330 is shown on the left side of array 305, it is understood that first pixel 330 may be positioned in any other location within the array, including, but not limited to, the right side of array 305. In some examples, first pixel 330 may be positioned on the left side of array 305 and another pixel similar to first pixel 330 may be positioned on the right side of array 305.

Although first pixel 330 is shown on an outer edge of image sensor 300, in some examples first pixel 330 may be placed in any location between two columns of pixels of image sensor 300 (e.g., between first column 310 and second column 315, between first column 310 and third column 340).

Although second pixel 335 is shown on the bottom of array 305, it is understood that second pixel 335 may be positioned in any other location within the array, including, but not limited to, on the top of array 305. In some examples, second pixel 335 may be positioned on the bottom of array 305 and another pixel similar to second pixel 335 may be positioned on the top of array 305.

Although second pixel 335 is shown on an outer edge of image sensor 300, in some examples second pixel 335 may be placed in any location between two rows of pixels of image sensor 300 (e.g., between first row 320 and second row 325, between first row 320 and third row 345).

As shown, a dimension of first pixel 330 (e.g., length, width) may exceed at least one dimension of at least one pixel of array 305. Similarly, a dimension of second pixel 335 may exceed at least one dimension of at least one pixel of array 305. In some examples, a dimension of first pixel 330 may exceed at least one dimension of second pixel 335. In some examples, a dimension of second pixel 335 may exceed at least one dimension of first pixel 330. In some examples, an area of first pixel 330 may exceed an area of second pixel 335. In some examples, an area of second pixel 335 may exceed an area of second pixel 335. In some examples, an aspect ratio of first pixel 330 may exceed an aspect ratio of second pixel 335. In some examples, an aspect ratio of second pixel 335 may exceed an aspect ratio of second pixel 335.

In some examples, an exposure time may be related to the size of a pixel configured to detect photons. The larger the pixel the faster the exposure, and the faster the exposure the faster photons may be detected. Accordingly, in some examples first pixel 330 or second pixel 335 may detect photons faster than a pixel of array 305. Thus, in some examples first pixel 330 or second pixel 335, or both, may be configured to detect a change in a field of view of image sensor 300.

In some examples, first pixel 330 or second pixel 335, or both, may be activated while at least a portion or a group of the pixels of array 305 may be deactivated. When a pixel is deactivated, the pixel draws no power or minimal power. Thus, deactivating the at least group of pixels of array 305 conserves power.

In some examples, at least some if not all of the at least group of pixels of array 305 may be deactivated as long as no change is detected, while the first pixel 330 or second pixel 335, or both, may be activated for monitoring and detecting changes in a field of view of image sensor 300. When first pixel 330 or second pixel 335, or both, detect a change in the field of view, one or more deactivated pixels of array 305 may be activated. In one example, when first pixel 330 detects a change in the field of view, the pixels of at least first column 310 may be activated. In some examples, when first pixel 330 detects a change in the field of view, all of the pixels of array 305 may be activated. In some examples, when first pixel 330 detects a change in the field of view, second pixel 335 may be activated.

In some examples, when second pixel 335 detects a change in the field of view, the pixels of at least first row 320 may be activated. In some examples, when second pixel 335 detects a change in the field of view, all of the pixels of array 305 may be activated. In some examples, when second pixel 335 detects a change in the field of view, first pixel 330 may be activated.

Figure 4:
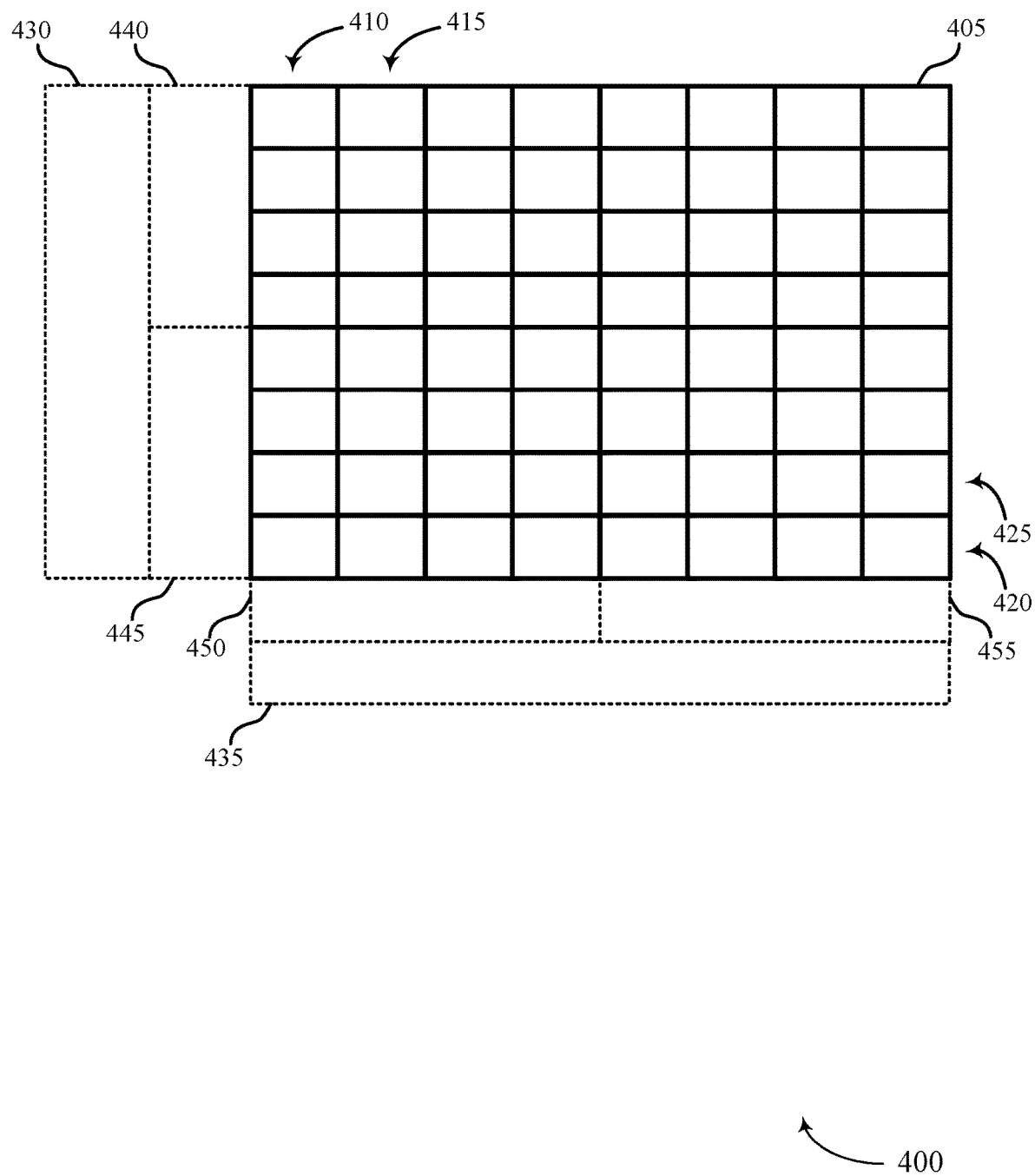
FIG. 4 illustrates an example of an image sensor that supports low power change detection and reduction of sensor power in accordance with aspects of the present disclosure.

FIG. 4 illustrates an example of an image sensor 400 that supports pixel for low power change detection and reduction of sensor power in accordance with aspects of the present disclosure. In some examples, image sensor 400 may implement aspects of system 100.

Image sensor 400 may be an example of image sensor 115 of FIG. 1, image sensor 200 of FIG. 2, or image sensor 300 of FIG. 3. In some examples, image sensor 400 may include an array of pixels (e.g., array 405). As shown, array 405 may include one or more columns of pixels (e.g., first column 410 and second column 415) and one or more rows of pixels (e.g., first row 420 and second row 425). In some examples, image sensor 400 may include first pixel 430 or second pixel 435, or first pixel 430 and second pixel 435.

As shown, first pixel 430 may be positioned adjacent to third pixel 440 and fourth pixel 445, while third pixel 440 and fourth pixel 445 may be placed adjacent to an outer edge of array 405. Additionally or alternatively, second pixel 435 may be positioned adjacent to fifth pixel 450 and sixth pixel 455, while fifth pixel 450 and sixth pixel 455 may be placed adjacent to an outer edge of array 405. In some examples, an aspect ratio or area of first pixel 430 may be greater than an aspect ratio of third pixel 440 or fourth pixel 445. In some examples, an aspect ratio or area of second pixel 435 may be greater than an aspect ratio of fifth pixel 450 or sixth pixel 455.

In some examples, first pixel 430 may be more or less sensitive to change detection than third pixel 440 or fourth pixel 445, or both. In some examples, a sensitivity of first pixel 430, third pixel 440, or fourth pixel 445 may be dynamically adjusted. For example, a sensitivity of first pixel 430 may be dynamically adjusted to be equal, less than, or greater than a sensitivity of third pixel 440 or fourth pixel 445.

In some examples, second pixel 435 may be more or less sensitive to change detection than fifth pixel 450 or sixth pixel 455, or both. In some examples, a sensitivity of second pixel 435, fifth pixel 450, or sixth pixel 455 may be dynamically adjusted. For example, a sensitivity of second pixel 435 may be dynamically adjusted to be equal, less than, or greater than a sensitivity of fifth pixel 450 or sixth pixel 455.

In some examples, first pixel 430 may be configured to monitor for detectable changes. In some examples, third pixel 440 or fourth pixel 445, or both may be activated or deactivated while first pixel 430 monitors for change detection. In some examples, third pixel 440 or fourth pixel 445, or both, may be activated when first pixel 430 detects a change based on the monitoring. In some examples, when first pixel 430 and at least one of third pixel 440 or fourth pixel 445 detect a change, one or more pixels of array 405 may be activated.

In some examples, second pixel 435 may be configured to monitor for detectable changes. In some examples, fifth pixel 450 or sixth pixel 455, or both may be activated or deactivated while second pixel 435 monitors for change detection. In some examples, fifth pixel 450 or sixth pixel 455, or both, may be activated when second pixel 435 detects a change based on the monitoring. In some examples, when second pixel 435 and at least one of fifth pixel 450 or sixth pixel 455 detect a change, one or more pixels of array 405 may be activated.

Figure 5:
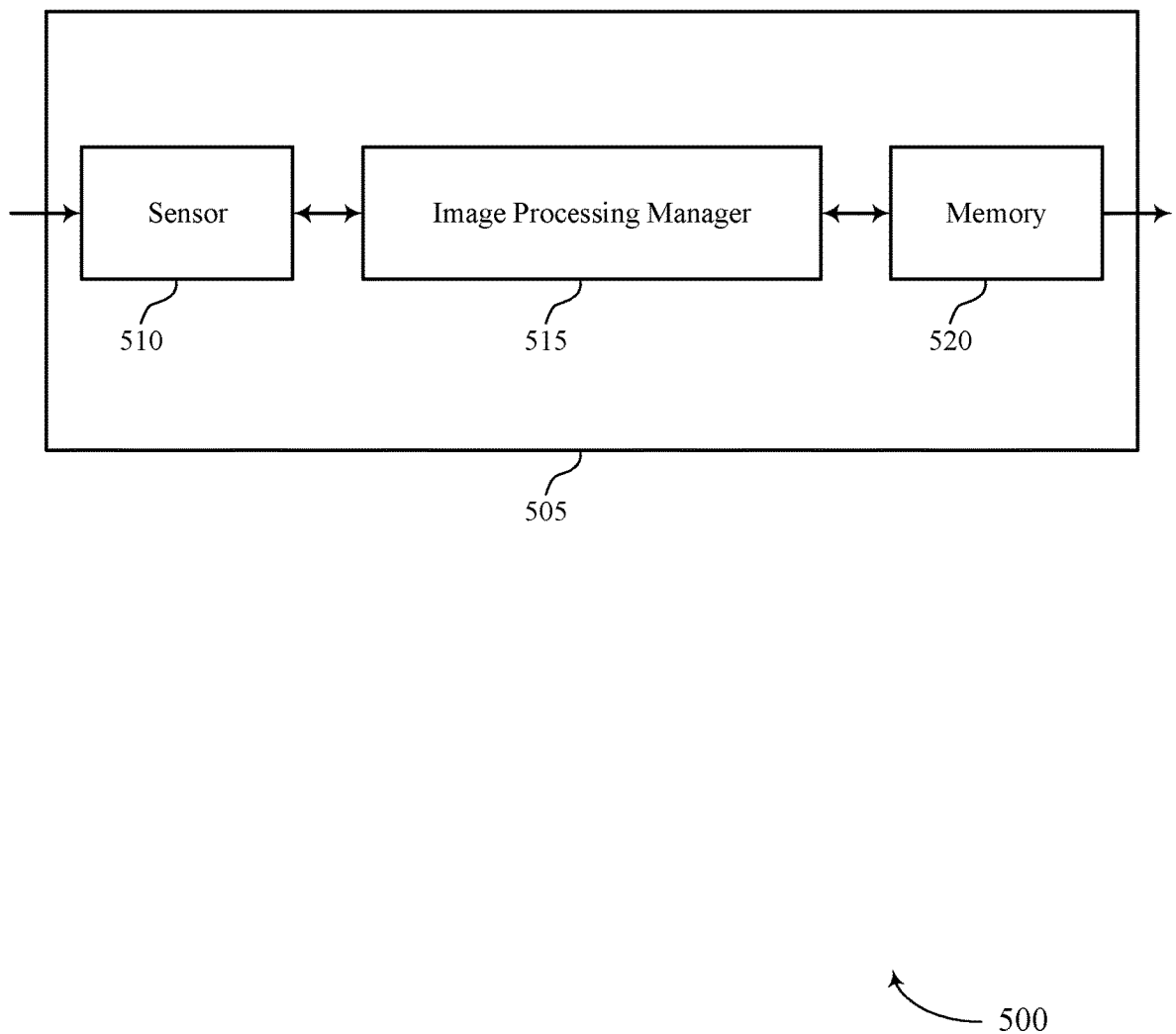
FIGS. 5 and 6 show block diagrams of devices that support low power change detection and reduction of sensor power in accordance with aspects of the present disclosure.

FIG. 5 shows a block diagram 500 of a device 505 that supports pixel for low power change detection and reduction of sensor power in accordance with aspects of the present disclosure. The device 505 may be an example of aspects of a device as described herein. The device 505 may include a sensor 510, an image processing manager 515, and a memory 520. The device 505 may also include a processor. Each of these components may be in communication with one another (e.g., via one or more buses).

The sensor 510 may be associated with an image capturing device (e.g., device 505). Sensor 510 may include or be an example of a digital imaging sensor for capturing photo images and video images. Examples of sensor 510 may include image sensors, gyro sensors, depth sensors, infrared sensors, autofocus sensors, or any combination thereof. The sensor 510 may be an example of aspects of image sensor 115 described with reference to FIG. 1. The sensor 510 may be an example of sensor 610 with reference to FIG. 6. In some examples, sensor 510 may sense changes in a field of view associated with device 505. For example, sensor 510 may capture one or more image samples and send the captured image data to image processing manager 515, enabling image processing manager 515 to monitor the field of view and detect changes based on analysis of the image data from sensor 510. In some examples, sensor 510 may include a large sensing pixel that is larger than pixels in a pixel array of an image sensor. In some examples, information received or captured by sensor 510 may be passed on to other components of the device 505.

The image processing manager 515 may monitor a field of view of an image sensor via a first pixel associated with a group of pixels of the image sensor, where a dimension of the first pixel exceeds a dimension of at least one pixel of the group of pixels of the image sensor, detect a change in the field of view of the image sensor based on the monitoring of the first pixel, and activate a second pixel of the image sensor based on detecting the change in the field of view of the image sensor. The image processing manager 515 may be an example of aspects of the image processing manager 810 described herein.

The image processing manager 515, or its sub-components, may be implemented in hardware, code (e.g., software or firmware) executed by a processor, or any combination thereof. If implemented in code executed by a processor, the functions of the image processing manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The image processing manager 515, or its sub-components, may be physically located at various positions, including being distributed such that portions of functions are implemented at different physical locations by one or more physical components. In some examples, the image processing manager 515, or its sub-components, may be a separate and distinct component in accordance with various aspects of the present disclosure. In some examples, the image processing manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Memory 520 may store information (e.g., monitoring data, change detection data, analysis data, image metadata) generated by other components of device 505 such as image processing manager 515. For example, memory 520 may store one or more images samples that image processing manager 515 compares with an output of image processing manager 515. In some examples, the memory 520 may be collocated with a sensor 510 in an imaging device (e.g., device 505). For example, the memory 520 may be an example of aspects of the memory 830 described with reference to FIG. 8. Memory 520 may comprise one or more computer-readable storage media. Examples of memory 520 include, but are not limited to, random access memory (RAM), static RAM (SRAM), dynamic RAM (DRAM), read-only memory (ROM), electrically erasable programmable read-only memory (EEPROM), compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor (e.g., image processing manager 515)

Figure 6:
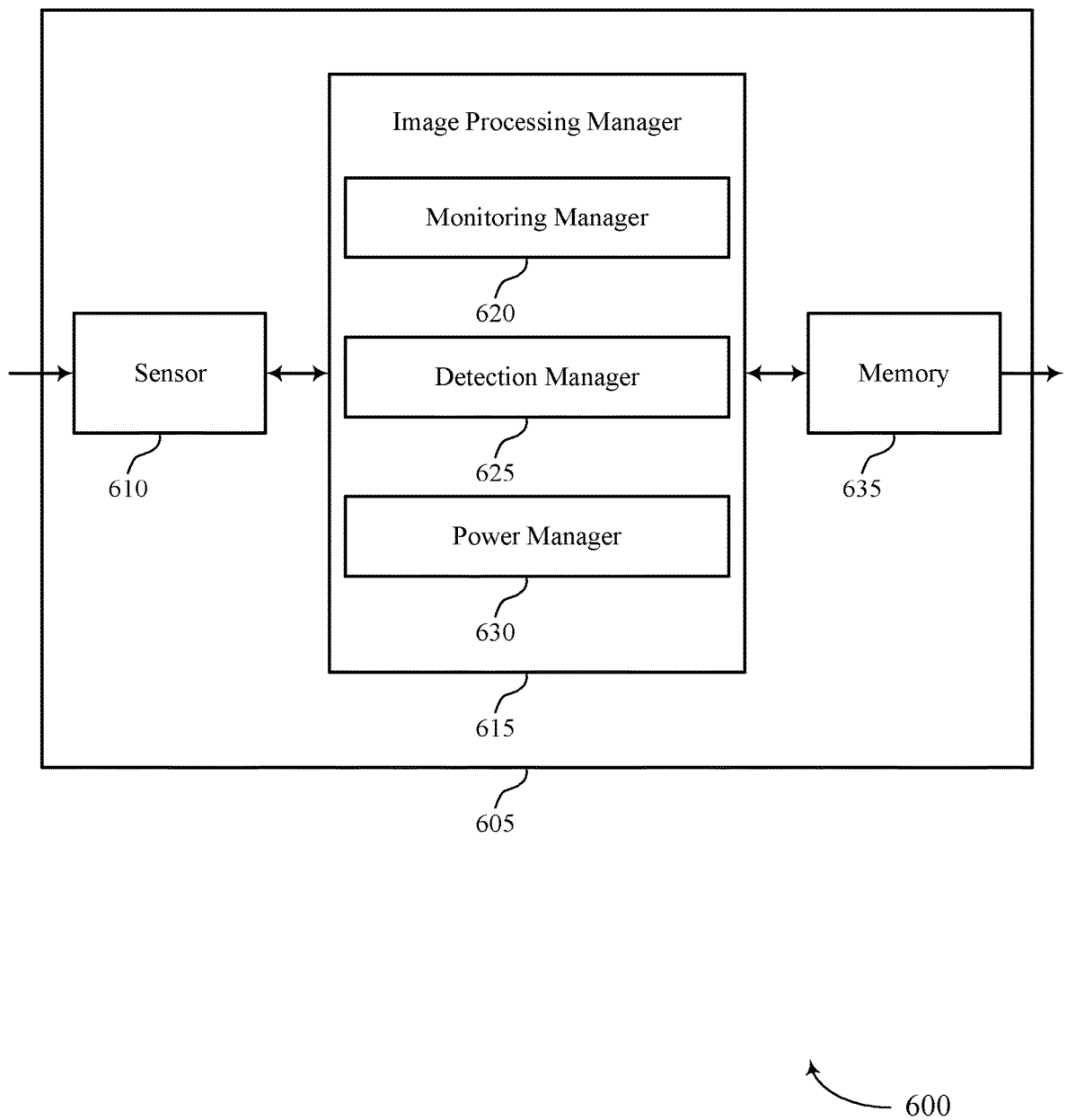

FIG. 6 shows a block diagram 600 of a device 605 that supports pixel for low power change detection and reduction of sensor power in accordance with aspects of the present disclosure. The device 605 may be an example of aspects of a device 505 or a device 105 as described herein. The device 605 may include a sensor 610, an image processing manager 615, and a memory 635. The device 605 may also include a processor. Each of these components may be in communication with one another (e.g., via one or more buses).

The sensor 610 may sense changes in a field of view associated with device 605. Sensor data from sensor 610 may be passed on to other components of the device 605. For example, sensor 610 may capture one or more image samples and send the captured image data to image processing manager 615, enabling image processing manager 615 to monitor the field of view and detect changes based on the image data from sensor 610. The sensor 610 may be an example of aspects of image sensor 115 described with reference to FIG. 1. The sensor 610 may be an example of sensor 510 with reference to FIG. 5.

The image processing manager 615 may be an example of aspects of the image processing manager 515 as described herein. The image processing manager 615 may include a monitoring manager 620, a detection manager 625, and a power manager 630. The image processing manager 615 may be an example of aspects of the image processing manager 810 described herein.

The monitoring manager 620 may monitor a field of view of an image sensor via a first pixel associated with a group of pixels of the image sensor, where a dimension of the first pixel exceeds a dimension of at least one pixel of the group of pixels of the image sensor. The detection manager 625 may detect a change in the field of view of the image sensor based on the monitoring of the first pixel. The power manager 630 may activate a second pixel of the image sensor based on detecting the change in the field of view of the image sensor.

The memory 635 may receive, transmit, or store information, data, or signals generated by other components of the device 605. In some examples, the memory 635 may be collocated with a sensor 610 in an imaging device (e.g., device 605). In some examples, the memory 635 may be an example of aspects of memory 830 described with reference to FIG. 8.

Figure 7:
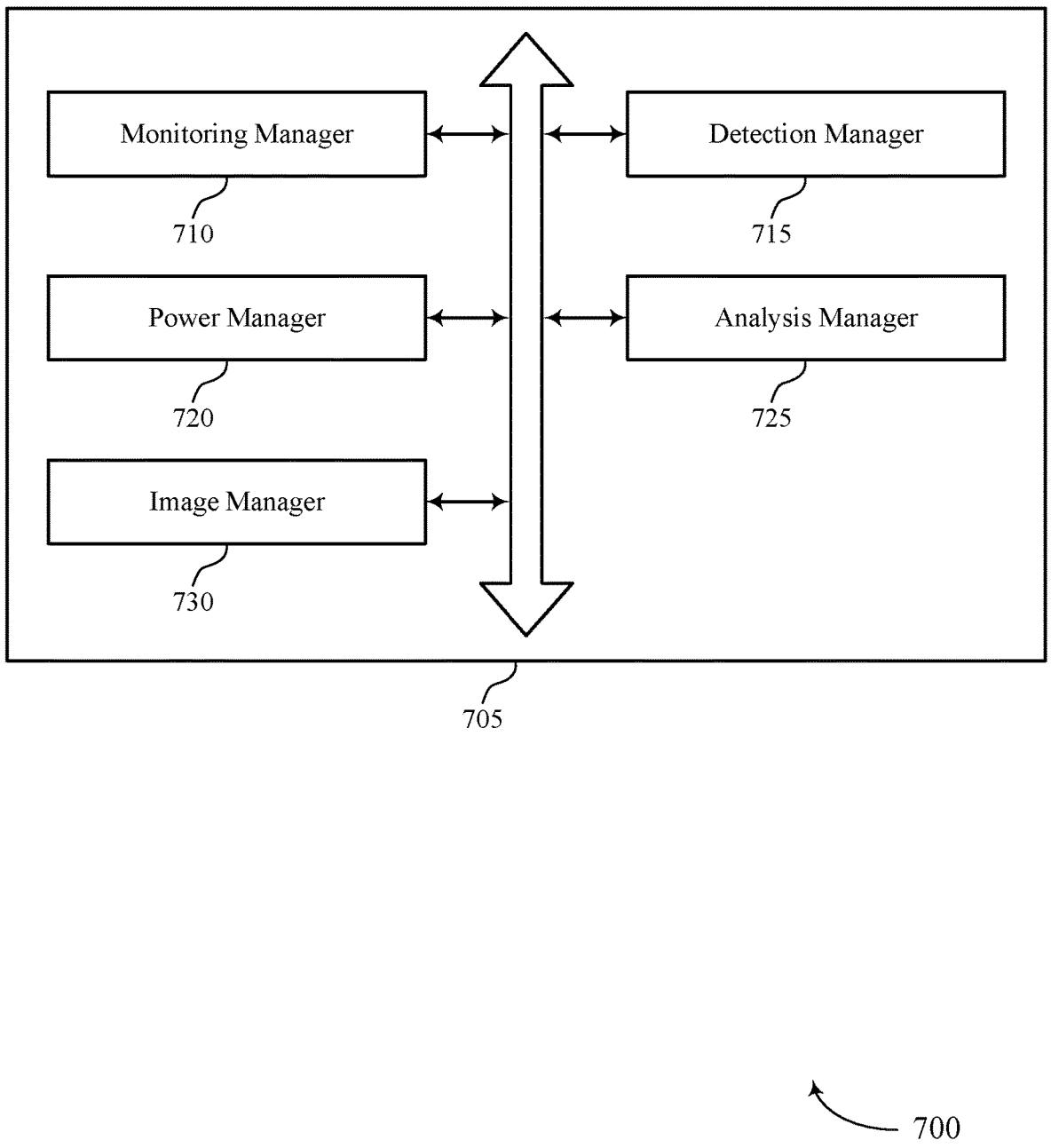
FIG. 7 shows a block diagram of an image processing manager that supports low power change detection and reduction of sensor power in accordance with aspects of the present disclosure.

FIG. 7 shows a block diagram 700 of an image processing manager 705 that supports pixel for low power change detection and reduction of sensor power in accordance with aspects of the present disclosure. The image processing manager 705 may be an example of aspects of an image processing manager 515, an image processing manager 615, or an image processing manager 810 described herein. The image processing manager 705 may include a monitoring manager 710, a detection manager 715, a power manager 720, an analysis manager 725, and an image manager 730. Each of these modules may communicate, directly or indirectly, with one another (e.g., via one or more buses).

The monitoring manager 710 may monitor a field of view of an image sensor via a first pixel associated with a group of pixels of the image sensor, where a dimension of the first pixel exceeds a dimension of at least one pixel of the group of pixels of the image sensor.

In some examples, the monitoring manager 710 may monitor the field of view of the image sensor via the second pixel, where a dimension of the second pixel is less than a dimension of the first pixel, where detecting the change in the field of view of the image sensor is based on monitoring the field of view of the image sensor via the second pixel.

In some examples, the dimension of the first pixel or the dimension of the second pixel exceed the dimension of the at least one pixel from the group of pixels. In some examples, a sensitivity of the second pixel is less than or greater than a sensitivity of the first pixel.

In some examples, an aspect ratio of the second pixel is different than an aspect ratio of the first pixel. In some examples, the first pixel is located at an outer edge of the image sensor or an outer edge of the group of pixels of the image sensor.

In some examples, the second pixel is located at an outer edge of the image sensor or an outer edge of the group of pixels of the image sensor, and the first pixel is located at an outer edge of the second pixel. In some examples, the first pixel spans an edge of the image sensor or an edge of the group of pixels of the image sensor.

In some examples, the second pixel is adjacent to the first pixel. In some examples, at least the first pixel and the second pixel are co-located on an outer edge of the image sensor or an outer edge of the group of pixels of the image sensor. The detection manager 715 may detect a change in the field of view of the image sensor based on the monitoring of the first pixel.

In some examples, the detection manager 715 may detect a potential change based on the monitoring of the first pixel. In some examples, the detection manager 715 may detect the change in the field of view of the image sensor is based on a change in brightness detected by the first pixel, a change in contrast detected by the first pixel, a change in color detected by the first pixel, a movement in the field of view detected by the first pixel, or any combination thereof.

The power manager 720 may activate a second pixel of the image sensor based on detecting the change in the field of view of the image sensor. In some examples, the power manager 720 may activate the at least one pixel from the group of pixels or at least one pixel of the image sensor based on detecting the change in the field of view of the image sensor by the monitoring of the first pixel, or based on detecting a change in the field of view of the image sensor by the monitoring of the second pixel, or based on detecting the change in the field of view of the image sensor by the monitoring of the first pixel and by the monitoring of the second pixel.

The analysis manager 725 may determine that the potential change exceeds a change threshold based on detecting the potential change.

The image manager 730 may capture, via the image sensor, an image based on detecting the change in the field of view of the image sensor.

Figure 8:
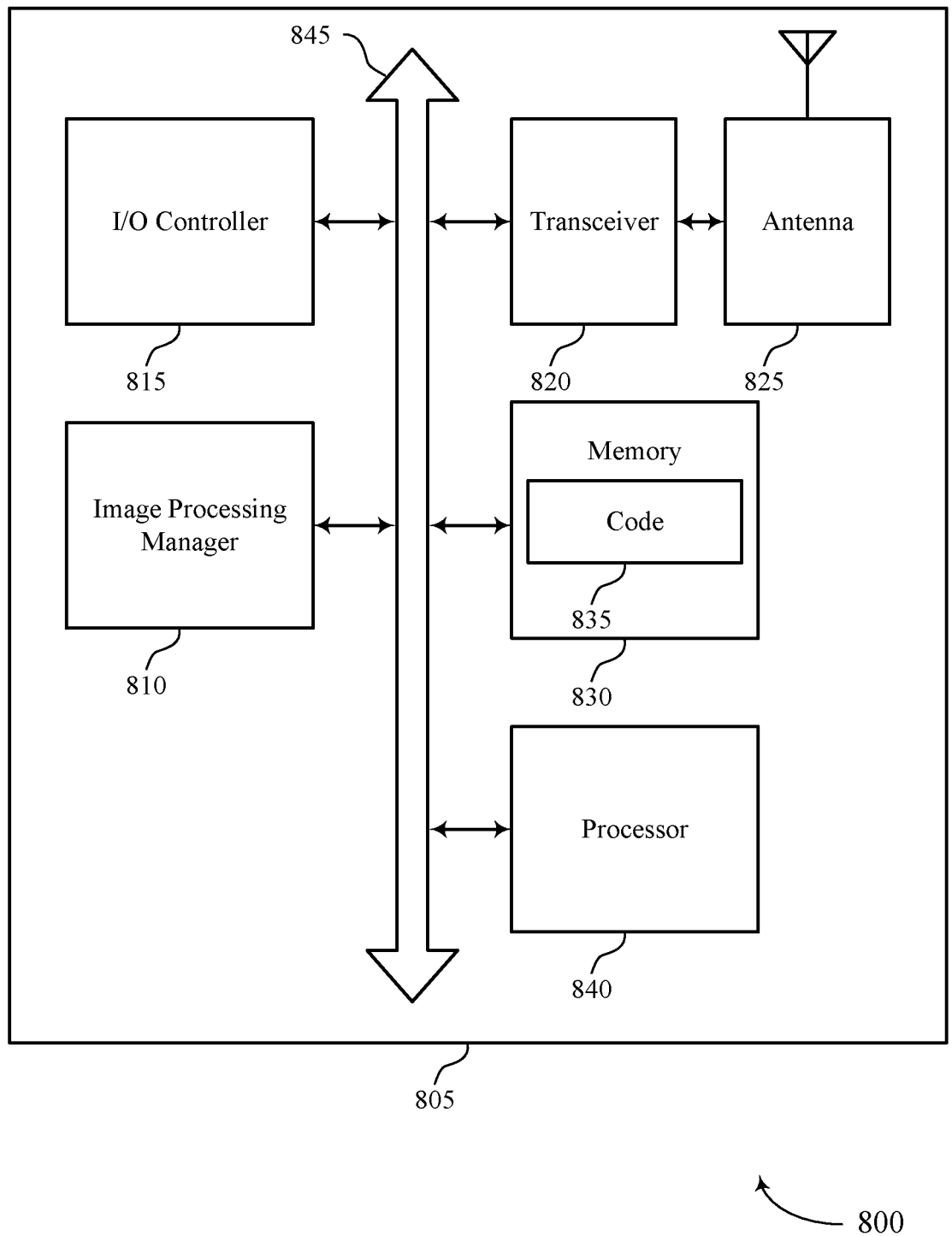
FIG. 8 shows a diagram of a system including a device that supports low power change detection and reduction of sensor power in accordance with aspects of the present disclosure.

FIG. 8 shows a diagram of a system 800 including a device 805 that supports pixel for low power change detection and reduction of sensor power in accordance with aspects of the present disclosure. The device 805 may be an example of or include the components of device 505, device 605, or a device as described herein. The device 805 may include components for bi-directional voice and data communications including components for transmitting and receiving communications, including an image processing manager 810, an I/O controller 815, a transceiver 820, an antenna 825, memory 830, a processor 840, and a coding manager 850. These components may be in electronic communication via one or more buses (e.g., bus 845).

The image processing manager 810 may monitor a field of view of an image sensor via a first pixel associated with a group of pixels of the image sensor, where a dimension of the first pixel exceeds a dimension of at least one pixel of the group of pixels of the image sensor, detect a change in the field of view of the image sensor based on the monitoring of the first pixel, and activate a second pixel of the image sensor based on detecting the change in the field of view of the image sensor.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some examples, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting pixel for low power change detection and reduction of sensor power).

The code 835 may include instructions to implement aspects of the present disclosure, including instructions to support image change detection. The code 835 may be stored in a non-transitory computer-readable medium such as system memory or other type of memory. In some examples, the code 835 may not be directly executable by the processor 840 but may cause a computer (e.g., when compiled and executed) to perform functions described herein.

Figure 9:
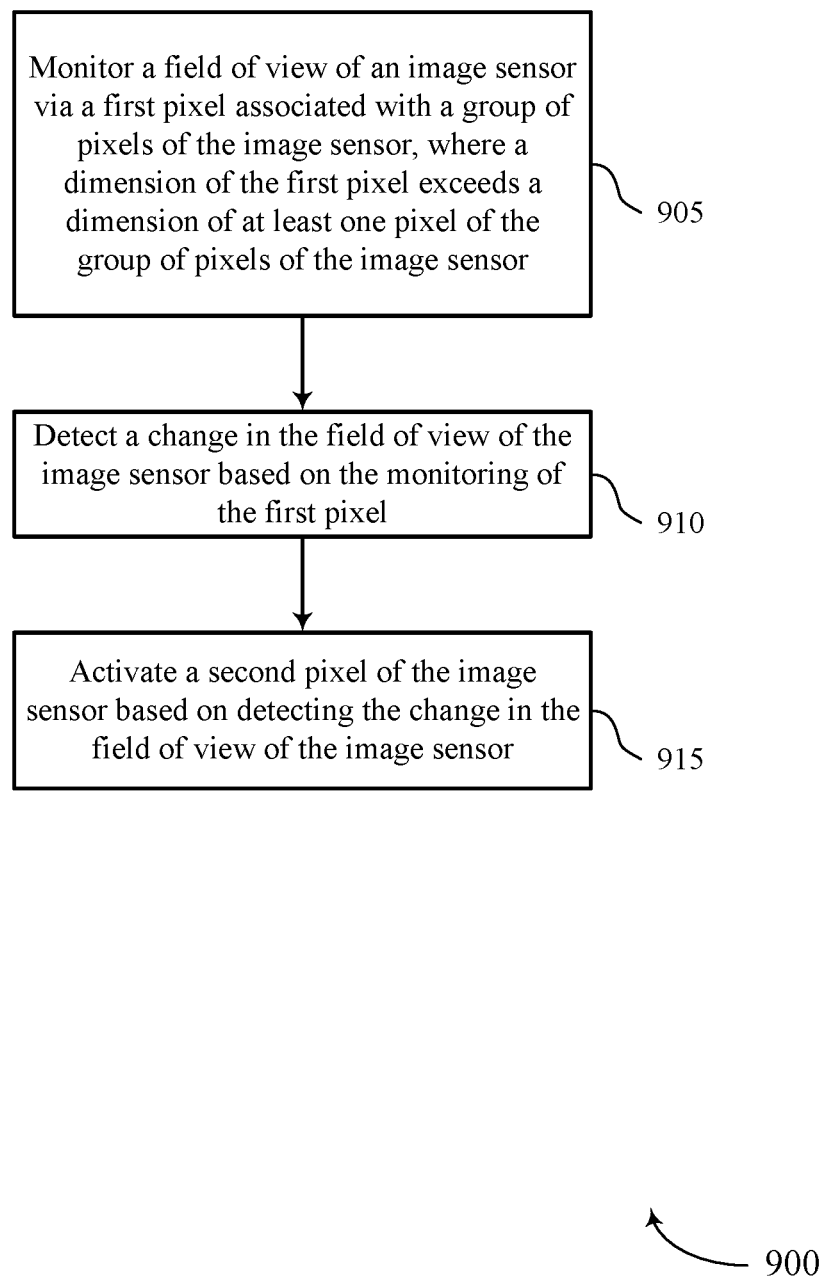
FIGS. 9 and 10 show flowcharts illustrating methods that support low power change detection and reduction of sensor power in accordance with aspects of the present disclosure.

FIG. 9 shows a flowchart illustrating a method 900 that supports pixel for low power change detection and reduction of sensor power in accordance with aspects of the present disclosure. The operations of method 900 may be implemented by a device or its components as described herein. For example, the operations of method 900 may be performed by an image processing manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may monitor a field of view of an image sensor via a first pixel associated with a group of pixels of the image sensor, where a dimension of the first pixel exceeds a dimension of at least one pixel of the group of pixels of the image sensor. The operations of 905 may be performed according to the methods described herein. In some examples, aspects of the operations of 905 may be performed by a monitoring manager as described with reference to FIGS. 5 through 8.

At 910, the device may detect a change in the field of view of the image sensor based on the monitoring of the first pixel. The operations of 910 may be performed according to the methods described herein. In some examples, aspects of the operations of 910 may be performed by a detection manager as described with reference to FIGS. 5 through 8.

At 915, the device may activate a second pixel of the image sensor based on detecting the change in the field of view of the image sensor. The operations of 915 may be performed according to the methods described herein. In some examples, aspects of the operations of 915 may be performed by a power manager as described with reference to FIGS. 5 through 8.

Figure 10:
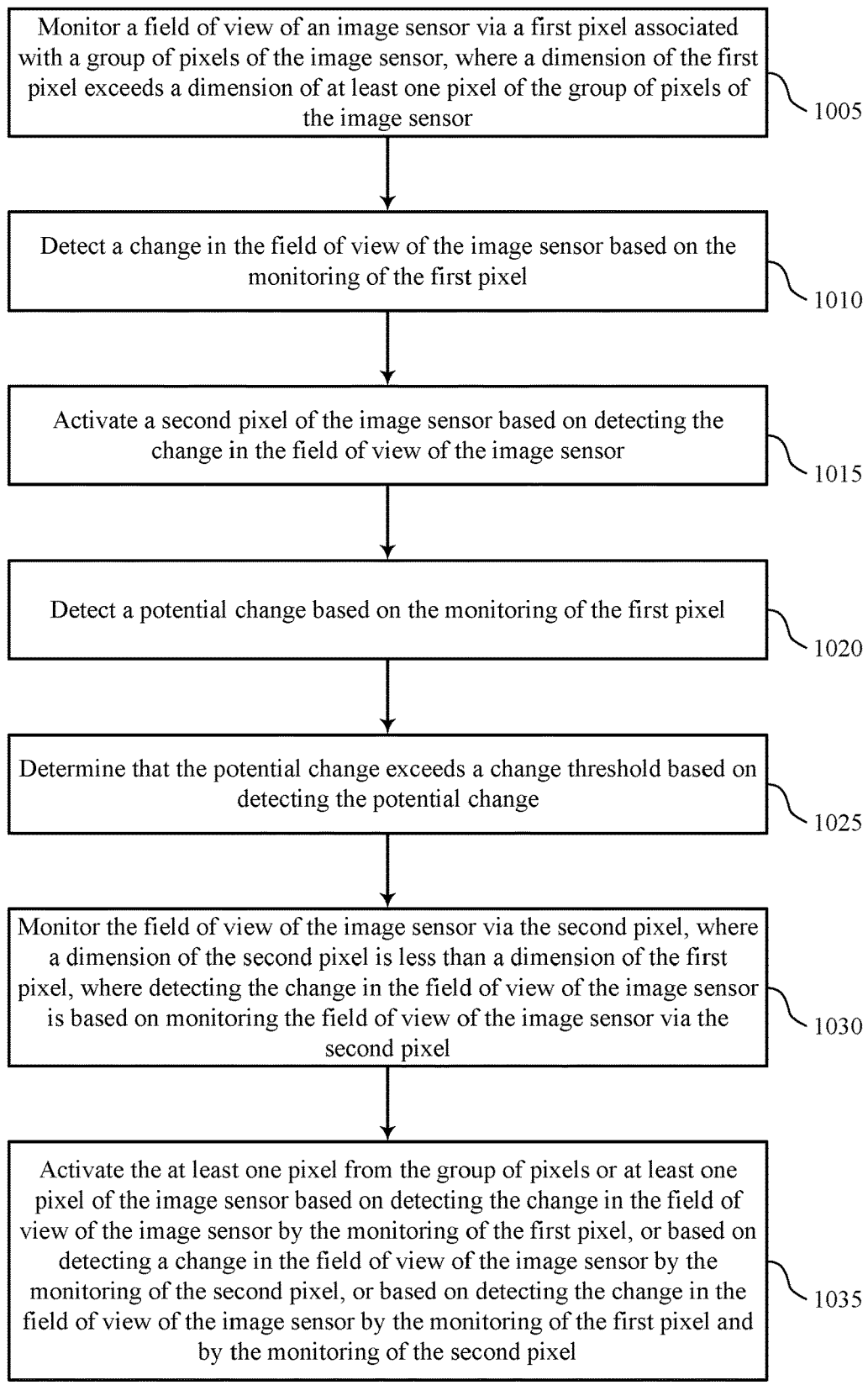

FIG. 10 shows a flowchart illustrating a method 1000 that supports pixel for low power change detection and reduction of sensor power in accordance with aspects of the present disclosure. The operations of method 1000 may be implemented by a device or its components as described herein. For example, the operations of method 1000 may be performed by an image processing manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may monitor a field of view of an image sensor via a first pixel associated with a group of pixels of the image sensor, where a dimension of the first pixel exceeds a dimension of at least one pixel of the group of pixels of the image sensor. The operations of 1005 may be performed according to the methods described herein. In some examples, aspects of the operations of 1005 may be performed by a monitoring manager as described with reference to FIGS. 5 through 8.

At 1010, the device may detect a change in the field of view of the image sensor based on the monitoring of the first pixel. The operations of 1010 may be performed according to the methods described herein. In some examples, aspects of the operations of 1010 may be performed by a detection manager as described with reference to FIGS. 5 through 8.

At 1015, the device may activate a second pixel of the image sensor based on detecting the change in the field of view of the image sensor. The operations of 1015 may be performed according to the methods described herein. In some examples, aspects of the operations of 1015 may be performed by a power manager as described with reference to FIGS. 5 through 8.

At 1020, the device may detect a potential change based on the monitoring of the first pixel. The operations of 1020 may be performed according to the methods described herein. In some examples, aspects of the operations of 1020 may be performed by a detection manager as described with reference to FIGS. 5 through 8.

At 1025, the device may determine that the potential change exceeds a change threshold based on detecting the potential change. The operations of 1025 may be performed according to the methods described herein. In some examples, aspects of the operations of 1025 may be performed by an analysis manager as described with reference to FIGS. 5 through 8.

At 1030, the device may monitor the field of view of the image sensor via the second pixel, where a dimension of the second pixel is less than a dimension of the first pixel, where detecting the change in the field of view of the image sensor is based on monitoring the field of view of the image sensor via the second pixel. The operations of 1030 may be performed according to the methods described herein. In some examples, aspects of the operations of 1030 may be performed by a monitoring manager as described with reference to FIGS. 5 through 8.

At 1035, the device may activate the at least one pixel from the group of pixels or at least one pixel of the image sensor based on detecting the change in the field of view of the image sensor by the monitoring of the first pixel, or based on detecting a change in the field of view of the image sensor by the monitoring of the second pixel, or based on detecting the change in the field of view of the image sensor by the monitoring of the first pixel and by the monitoring of the second pixel. The operations of 1035 may be performed according to the methods described herein. In some examples, aspects of the operations of 1035 may be performed by a power manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image change detection, comprising:
    monitoring a field of view of an image sensor via a first pixel associated with a group of pixels of the image sensor, wherein a dimension of the first pixel exceeds a dimension of at least one pixel of the group of pixels of the image sensor and a dimension of a second pixel;
    detecting a change in the field of view of the image sensor based at least in part on the monitoring of the first pixel; and
    activating the second pixel of the image sensor based at least in part on detecting the change in the field of view of the image sensor, wherein the dimension of the second pixel exceeds the dimension of the at least one pixel from the group of pixels, and wherein the second pixel is located at an outer edge of the group of pixels of the image sensor, and the first pixel is located at an outer edge of the second pixel.

2. The method of claim 1, wherein detecting the change in the field of view comprises:
    detecting a potential change based at least in part on the monitoring of the first pixel; and
    determining that the potential change exceeds a change threshold based at least in part on detecting the potential change.

3. The method of claim 1, further comprising:
    monitoring the field of view of the image sensor via the second pixel, wherein a dimension of the second pixel is less than the dimension of the first pixel, wherein detecting the change in the field of view of the image sensor is based at least in part on monitoring the field of view of the image sensor via the second pixel.

4. The method of claim 3, further comprising:
    activating the at least one pixel from the group of pixels or at least one pixel of the image sensor based at least in part on detecting the change in the field of view of the image sensor by the monitoring of the first pixel, or based at least in part on detecting a change in the field of view of the image sensor by the monitoring of the second pixel, or based at least in part on detecting the change in the field of view of the image sensor by the monitoring of the first pixel and by the monitoring of the second pixel.

5. The method of claim 1, further comprising:
    capturing, via the image sensor, an image based at least in part on detecting the change in the field of view of the image sensor.

6. The method of claim 1, wherein a sensitivity of the second pixel is less than or greater than a sensitivity of the first pixel.

7. The method of claim 1, wherein an aspect ratio of the second pixel is different than an aspect ratio of the first pixel.

8. The method of claim 1, wherein:
    detecting the change in the field of view of the image sensor is based at least in part on a change in brightness detected by the first pixel, a change in contrast detected by the first pixel, a change in color detected by the first pixel, a movement in the field of view detected by the first pixel, or any combination thereof.

9. The method of claim 1, wherein the first pixel is located at an outer edge of the image sensor.

10. The method of claim 1, wherein the first pixel spans an edge of the image sensor or an edge of the group of pixels of the image sensor.

11. The method of claim 1, wherein the second pixel is adjacent to the first pixel.

12. The method of claim 11, wherein at least the first pixel and the second pixel are co-located on an outer edge of the image sensor or the outer edge of the group of pixels of the image sensor.

13. An apparatus for image change detection, comprising:
    a processor, memory coupled with the processor; and instructions stored in the memory and executable by the processor to cause the apparatus to:
        monitor a field of view of an image sensor via a first pixel associated with a group of pixels of the image sensor, wherein a dimension of the first pixel exceeds a dimension of at least one pixel of the group of pixels of the image sensor and a dimension of a second pixel;
        detect a change in the field of view of the image sensor based at least in part on the monitoring of the first pixel; and activate the second pixel of the image sensor based at least in part on detecting the change in the field of view of the image sensor, wherein the dimension of the second pixel exceeds the dimension of the at least one pixel from the group of pixels, and wherein the second pixel is located at an outer edge of the group of pixels of the image sensor, and the first pixel is located at an outer edge of the second pixel.

14. The apparatus of claim 13, wherein the instructions to detect the change in the field of view are executable by the processor to cause the apparatus to:
   detect a potential change based at least in part on the monitoring of the first pixel; and
   determine that the potential change exceeds a change threshold based at least in part on detecting the potential change.

15. The apparatus of claim 13, wherein the instructions are further executable by the processor to cause the apparatus to:
   monitor the field of view of the image sensor via the second pixel, wherein a dimension of the second pixel is less than a dimension of the first pixel, wherein detecting the change in the field of view of the image sensor is based at least in part on monitoring the field of view of the image sensor via the second pixel.

16. The apparatus of claim 15, wherein the instructions are further executable by the processor to cause the apparatus to:
   activate the at least one pixel from the group of pixels or at least one pixel of the image sensor based at least in part on detecting the change in the field of view of the image sensor by the monitoring of the first pixel, or based at least in part on detecting a change in the field of view of the image sensor by the monitoring of the second pixel, or based at least in part on detecting the change in the field of view of the image sensor by the monitoring of the first pixel and by the monitoring of the second pixel.

17. An apparatus for image change detection, comprising:
   means for monitoring a field of view of an image sensor via a first pixel associated with a group of pixels of the image sensor, wherein a dimension of the first pixel exceeds a dimension of at least one pixel of the group of pixels of the image sensor and a dimension of a second pixel;
   means for detecting a change in the field of view of the image sensor based at least in part on the monitoring of the first pixel; and
   means for activating the second pixel of the image sensor based at least in part on detecting the change in the field of view of the image sensor, wherein the dimension of the second pixel exceeds the dimension of the at least one pixel from the group of pixels, and wherein the second pixel is located at an outer edge of the group of pixels of the image sensor, and the first pixel is located at an outer edge of the second pixel.

18. The apparatus of claim 17, wherein the means for detecting the change in the field of view comprises:
   means for detecting a potential change based at least in part on the monitoring of the first pixel; and
   means for determining that the potential change exceeds a change threshold based at least in part on detecting the potential change.

* * * * *